United States Patent [19]

Granville et al.

[11] Patent Number: 5,019,141
[45] Date of Patent: May 28, 1991

[54] VENT LINE SEPARATOR

[75] Inventors: Jeffrey H. Granville; John Church; David H. Hodgkins, all of Modesto, Calif.

[73] Assignee: Parker Hannifin Corp., Cleveland, Ohio

[21] Appl. No.: 596,201

[22] Filed: Oct. 11, 1990

[51] Int. Cl.⁵ .............................................. B01D 19/00
[52] U.S. Cl. ........................................ 55/170; 55/199; 137/202; 141/303; 210/120; 210/188; 220/85 VR; 220/86.1
[58] Field of Search .................... 55/88, 165, 168-170, 55/199, 201; 141/44, 45, 286, 303; 137/202; 210/120, 188; 220/85 VS, 85 VR, 86.1

[56] References Cited

U.S. PATENT DOCUMENTS

| | | | |
|---|---|---|---|
| 2,861,647 | 11/1958 | Musslewhite | 55/201 X |
| 3,958,591 | 5/1976 | Hansel et al. | 137/202 |
| 4,011,884 | 3/1977 | Drori | 137/202 |
| 4,699,638 | 10/1987 | Harris | 55/168 |
| 4,760,858 | 8/1988 | Szlaga | 220/85 VR X |

Primary Examiner—Charles Hart
Attorney, Agent, or Firm—Cassidy, Vance & Tarleton

[57] ABSTRACT

A vent line separator (30) having a housing (34) defining an interior chamber (44) having a flow diverter (132) positioned therein that separates liquid and gas and a by-pass valve assembly (106) that permits gas to be vented to the atmosphere under a predetermined minimum pressure, that prevents gas and liquid from being vented to the atmosphere when the liquid pressure in the interior chamber (44) is above a predetermined minimum pressure and below a predetermined maximum pressure, and allows venting of liquid fuel and gas to the atmosphere when liquid pressure in the interior chamber (44) is above a predetermined maximum pressure.

11 Claims, 3 Drawing Sheets

VENT LINE SEPARATOR

TECHNICAL FIELD

The present invention relates to fuel tank venting systems, and, more particularly, to a fuel tank vent line separator that separates and returns liquid fuel entrapped in the vent line to the fuel tank to prevent overboard venting of the liquid fuel.

BACKGROUND OF THE INVENTION

Motorized vehicles, and, in particular, marine craft, typically employ a hull-mounted fuel tank to store a supply of liquid fuel for the engine. Marine fuel tanks in general have a fill tube formed on the tank to enable filling of the tank with liquid fuel. These fill tubes are sealed off with a cap to prevent the entry of contaminants into the tank and to prevent the escape of liquid fuel and vapors. To maintain atmospheric pressure in the tank, a fuel tank vent line is installed having one end opening into the top of the tank and the other end opening to the atmosphere. The vent line permits fuel to be added to or removed from the tank without meeting resistance from positive or negative air pressure, respectively. In addition, the fuel tank vent line prevents the dangerous buildup of fuel pressure in the tank.

One major drawback to the present configuration of fuel tank vent lines is the unintentional overboard venting of fuel through the vent lines. This situation frequently occurs when refueling the inboard fuel tanks in marine vessels. During the refueling process, the rush of incoming fuel displaces vapor from the head space of the fuel tank into the vent line and then out to the lower pressure of the atmosphere. As the tank becomes full, this displaced vapor carries foam and liquid fuel through the fuel tank vent line where it is discharged overboard into the water or on to land. Needless to say, this is not only embarrassing to the boat owner, but, more importantly, it is detrimental to all forms of life, including water fowl and marine life.

A number of government and private organizations regulate the construction and use of marine craft. Among these organizations are the United States Coast Guard, the National Marine Manufacturers Association, and the American Boat and Yacht counsel. With respect to the latter, all manufacturers of marine pleasure craft that belong to the American Boat and Yacht Counsel and that wish to display and advertise the approval of the American Boat and Yacht Counsel must comply with its standards known as H-24 and H-33, "Gas and Diesel Fuel Systems," respectively. Proposed revisions to these standards include the requirements that any fuel tank vent line separator used with a marine fuel tank system must be independently mounted and permanently installed; have means to contain and return liquid; continuously vent during normal operation; and allow venting of liquid fuel at pressures greater than 2.4 pounds per square inch. The main thrust of these proposed regulations and requirements is the continuous maintenance of safe pressures in the fuel tank to prevent the dangerous buildup of vapor and resulting explosion.

While there are a number of devices that are designed to separate liquid and recover vapor, there are none known in the art that are specifically designed for installation in a fuel tank vent line to vent the fuel tank to the atmosphere while preventing the overboard venting of liquid fuel. For instance, U.S. Pat. No. 3,981,156 issued to Modisette et al, is directed to a vapor recovery system utilizing a vapor scrubber that recovers storage tank exhaust vapors into a closed system by absorption in a refrigerated spray. As such, the device of Modisette et al is designed to prevent the exhausting of any vapor to the atmosphere. This is unsuitable for applications to fuel tank vent lines. U.S. Pat. No. 4,769,050, issued to Shaw et al, discloses a liquid separator assembly for separating liquid from a liquid-entrained vapor. This assembly is integrally formed with a fill tube that has an enclosed containment chamber formed thereon. In this assembly, an oil fill tube is used to function as the crank case vent tube. A separate vent line is not desirable since oil is not added at the high volume and high rate that fuel is added to a fuel tank, and crankcase lubrication oil is not as easily combustible as liquid fuel. While this may be suitable for its purpose, it would not function to separate fuel and vapor in a fuel tank vent line where fuel is being added at a high volume and rate and to maintain continuous venting under normal operations.

Finally, U.S. Pat. No. 4,809,863, issued to Woodcock et al, teaches a fill neck assembly for an on-board refueling vapor recovery system. The fill neck assembly includes a space formed between the interior of an outer hose and the exterior of a fill pipe that constitutes a passageway through which fuel vapor flows from the head space of a fuel tank into a vapor flow passage and thence to a vapor canister. Within the passageway is mounted a float ball and a valve seat for preventing the flow of liquid into the refueling vapor canister from the vapor flow passage. During refueling, should liquid fuel back up through the vapor passageway, the ball will seat in the valve seat, preventing the flow of liquid and vapor. As a result, vapor and liquid is entrapped in the vapor passageway and it is unable to be directed into the fueling vapor canister. In this situation, pressure will continue to build until it is released by a breech in the system. This could easily result in an explosion.

Consequently, there is a need for a device that can be easily and quickly retrofitted to existing fuel tank vent lines as well as installed on future fuel tank vent lines and that continuously vents during normal operation and refueling while preventing the discharge of fuel into the environment.

SUMMARY OF THE INVENTION

While the present invention was developed for use with fuel tanks in marine craft, it is to be understood that it will have application with the storage of any liquid where it is desirable to vent the liquid storage tank to the atmosphere while containing the liquid within the tank and the venting system. Therefore, the present invention is directed to a fuel tank vent separator for use with fuel tanks having a first opening for a fill tube and a second opening for a vent line. The separator comprises a housing defining an interior chamber; a first port in the housing in continuous fluid communication with the chamber; a second port in the housing in fluid communication with the chamber and in fluid communication with the atmosphere; a liquid separator in the form of a flow diverter in the chamber to direct the flow of liquid down to a lower portion of the chamber while permitting the passage of vapor and gas through the chamber to the second port; a valve for selectively permitting the flow of liquid and gas through the second port such that liquid is permitted to flow through the second port only when the liquid pressure in the chamber is above a predetermined maximum liquid pressure; and one or more liquid return ports for returning liquid in the lower portion of the chamber to the first port and thence to the tank, whereby the headspace in the tank is continuously maintained at ambient air pressure and the overboard venting of the liquid is prevented under normal operating conditions.

In accordance with another aspect of the present invention, the second port is positioned vertically higher than the first port.

In accordance with yet another aspect of the present invention, the flow diverter further permits the flow of liquid to the second port when the chamber fills with liquid.

In accordance with another aspect of the present invention, the separator includes attachment fittings on the housing for attaching the housing to a structural member.

In accordance with a further aspect of the present invention, the valve is configured to permit a continuous flow of liquid and gas to the second port when the liquid pressure in the chamber is above a predetermined maximum liquid pressure, to permit a continuous flow of gas and vapor to the second port when the liquid pressure in the chamber is below a predetermined minimum liquid pressure, and to prevent the flow of liquid and gas when the liquid pressure in the chamber is below the predetermined maximum liquid pressure and above the predetermined minimum liquid pressure.

As will be readily appreciated from the foregoing description, the present invention is designed to eliminate the unintentional overboard venting of liquid fuel and other hazardous liquid chemicals into the environment, especially during refueling of marine craft. The fuel tank vent line separator formed in accordance with the present invention includes a housing that is configured to be easily attached to a structural member near the fuel tank for permanent installation. Connection of vent line hoses to the separator is facilitated with conventional hose barbs attached to the first and second ports. Consequently, retrofitting of the separator to existing marine craft is greatly simplified. When installed in the fuel tank vent line, the separator provides a chamber to temporarily trap foam and liquid fuel that is forced into the vent line by displaced vapor in the fuel tank. The captured liquid fuel in the chamber is returned to the fuel tank when the pressure in the tank is equalized to atmospheric pressure. The vapor and gas entering the chamber under positive pressure from the vent line flows around the flow diverter and to the upper portion of the chamber where it then passes to the atmosphere through the second port. The vent line separator not only has the ability to absorb fuel that would normally be discharged overboard as a result of refueling, operation in rough waters or thermal expansion, it also includes a spring-loaded bypass valve that will temporarily release excess pressure in the chamber through the vent line to prevent damage or leaks to the fuel tank, fuel pump, carburetors and fuel injectors, and other components of the fuel system.

BRIEF DESCRIPTION OF THE DRAWINGS

The foregoing and other features and advantages of the present invention will be more readily appreciated as the same becomes better understood from the detailed description of a representative embodiment when taken in conjunction with the following drawings, wherein.

DETAILED DESCRIPTION OF THE PREFERRED EMBODIMENT

Figure 1:
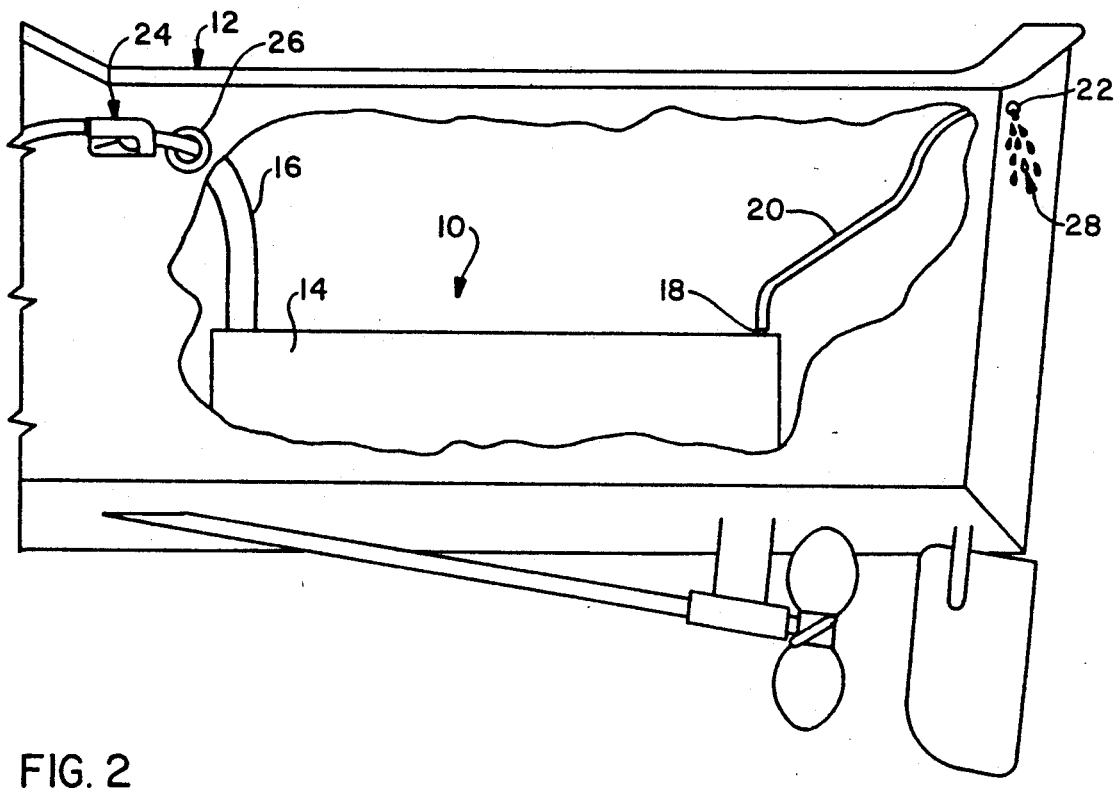
FIG. 1 is an isometric representation of a prior art fuel tank venting system.

Referring initially to FIG. 1, depicted therein is a typical fuel tank system 10 for a marine craft 12 (shown only partially therein). In general, marine fuel tank systems include a fuel tank 14 having a fill tube 16 formed thereon to enable filing of the tank 14 with liquid fuel and a vent line fitting 18 that opens to the fuel tank and is in fluid communication with a vent line 20. The vent line 20 opens to the atmosphere through a hull-mounted fitting 22. Fuel is added to the tank 14 from an outside source, such as the fuel line nozzle 24 illustrated therein. Once fuel is added to the tank, the opening 26 in the fill tube 16 is covered with a cap (not shown) having an airtight seal to prevent the escape of liquid fuel and vapors and to prevent the introduction of contaminants into the tank. Atmospheric pressure in the tank 14 is maintained by venting of the headspace in the tank 14 through the vent line 20.

When the inboard fuel tank 14 is refueled, the rush of incoming fuel displaces vapor from the headspace of the tank 14 through the vent line 20 to the lower pressure of the atmosphere. However, as the tank 14 becomes full, this displaced vapor will carry foam and liquid fuel through the vent line 20 and out to the environment through the hull-mounted fitting 22, as illustrated by the discharged fuel 28 in FIG. 1. This venting of liquid fuel to the atmosphere also occurs when the boat is rocking at the dock or is underway with near full tanks in rough waters. The presence of fuel outside the fuel tank creates a risk of damage to the boat, surrounding property, and serious injury to all forms of life should the fuel ignite. Furthermore, the presence of liquid fuel in the water is known to result in serious environmental damage and the prevention or destruction of marine life.

Figure 2:
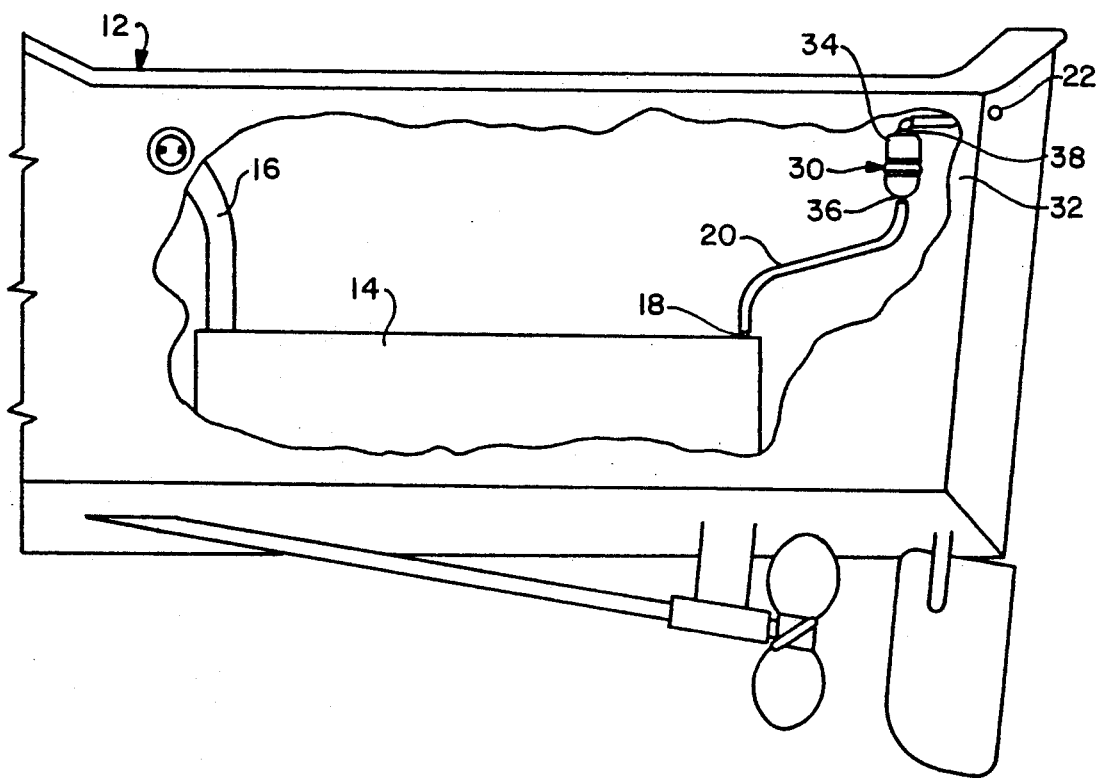
FIG. 2 is an isometric view of a fuel tank vent line separator formed in accordance with the present invention as installed on a marine craft fuel tank venting system.

The present invention is directed to preventing the unintentional overboard venting of fuel through the fuel tank vent lines. Illustrated in FIG. 2 is the vent line separator 30 formed in accordance with the present invention. More particularly, the vent line separator 30 is mounted in the fuel tank system 10 described above with respect to FIG. 1. As illustrated herein, the vent line separator 30 is installed in the existing vent line 20 to prevent the discharge of liquid fuel through the vent line 20. The separator 30 includes a housing 34 that is designed to enable permanent mounting to the hull or a bulkhead on the hull 32. A first fitting 36 is provided at the bottom of the housing 34 and a second fitting 38 is provided at the top of the housing 34 to facilitate connection of the separator 30 into the existing vent line 20. For proper performance, the separator 30 is mounted as high as possible on the hull 32 of the marine craft 12 in an upright position, i.e., with the second fitting 38 vertically higher than the first fitting 36.

Figure 3:
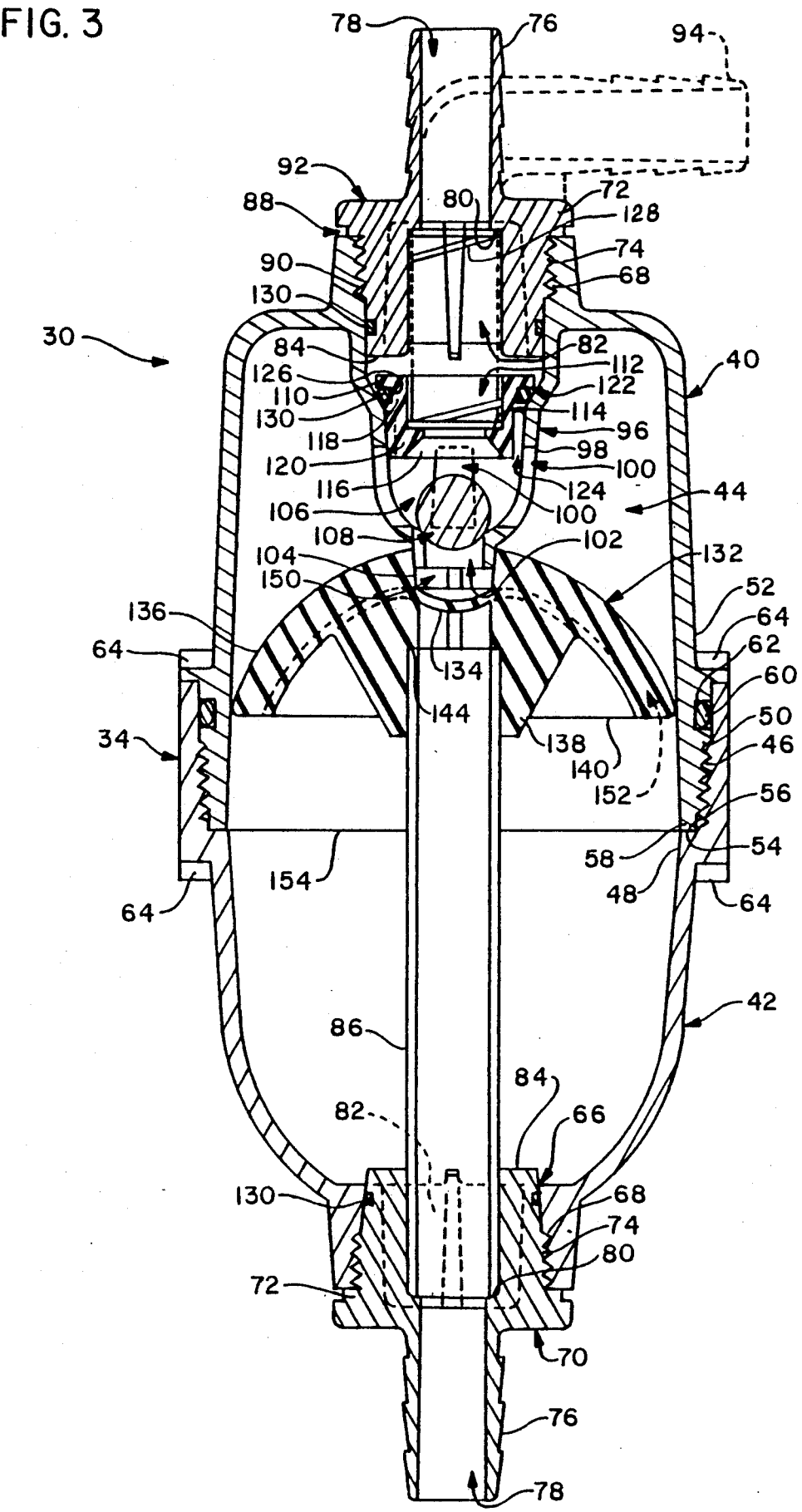
FIG. 3 is a cross-sectional side view of a fuel tank vent line separator formed in accordance with the present invention.

Turning now to FIG. 3, the separator 30 is illustrated in greater detail. The housing 34 is formed of a top half 40 and a bottom half 42 that are threadably connected together to define an interior chamber 44. The top half 40 and the bottom half 42 each have a U-shaped cross-sectional configuration. Internal threads 46 are formed around the inside periphery 48 of the bottom half 42. The inside periphery 48 of the bottom half 42 also has a shoulder 54 formed thereon. Similarly, external threads 50 are formed around the outside periphery 52 of the top half 40. The top half 40 includes an outside face 56 formed on the rim 58 that bears against the shoulder 54 of the bottom half 42 when the top half 40 and bottom half 42 are threadably fastened together. This provides a fluid seal for the interior chamber 44. Additionally, an O-ring 60 is placed in a groove 62 formed in the outside periphery 52 of the top half 40 adjacent the external threads 50.

While the separator 30 can be installed by simply splicing it into the line and letting it depend therefrom, it is more desirable to have the separator 30 permanently mounted to the hull or a bulk head of the marine craft. This is desirable for a number of reasons. First, the separator 30 will achieve maximum performance if maintained in an upright position. Second, construction and installation standards of the agencies and organizations described above require permanent installation. Finally, the weight of the separator 30, especially if filled with liquid, can cause a large amount of stress to be placed on the vent line 20, causing wear and fatigue that can result in the failure of the vent line 20 and a dangerous fuel leak. To facilitate the permanent installation of the separator 30, a plurality of flanges known as Gibs 64 are formed at equidistant intervals around the exterior of the top and bottom halves 40 and 42. With the separator 30 in an upright position, the Gibs 64 will be vertically positioned around the circumference at the midpoint of the housing 34. While any number may be used, ideally eight Gibs 64 are formed on the housing 34. These Gibs 64 provide a shoulder on the housing 34 that can rest on a clamp or strap used to attach the separator 30 to a structural member. They also provide a grip for the top and bottom halves 40 and 42 of the housing 34 when the halves are threaded and unthreaded.

An inlet port 66 is formed at the lowest point of the bottom half 42 of the housing 34 and is formed with internal threads 68 to receive a hose barb 70. The main body 72 of the hose barb 70 has external threads 74 on the exterior to threadably engage the internal thread 68 on the inlet port 66. A barbed nipple 76 projects downward from the body 72 for insertion into the vent line from the fuel tank. A longitudinal bore 78 is formed through the hose barb 70 with the portion of the bore 78 in the main body 72 having a larger internal diameter than the portion of the bore 78 in the barbed nipple 76. This forms an internal shoulder 80 in the main body 72. A plurality of slots 82 are formed in the portion of the internal bore 78 in the main body 72. These grooves 82 begin at the top face 84 of the hose barb 70 and project into the main body 72 past the internal shoulder 80, thus forming a passageway between the exterior of the hose barb 70 at the top face 84 and the portion of the longitudinal bore 78 inside the barbed nipple 76.

An inlet riser tube 86 is slidably engaged within the longitudinal bore 78 in the main body 72 to bear against the internal shoulder 80, preferably with a press fit. They fluid communication is provided between the longitudinal bore 78 in the barbed nipple 76 and the interior chamber 44 by the grooves 82 formed in the main body 72.

The top half 40 of the housing 34 has an outlet port 88 formed therein with internal threads 90. A hose barb 92 is threadably engaged with the internal threads 90 of the outlet port 88. This hose barb 92 is identical to the hose barb 70 described above, and, for ease of description will use the same reference numbers as used to describe hose barb 70. As shown in phantom is an alternative embodiment of the hose barb 92 wherein the barbed nipple 94 is formed at approximately a 90 degree angle to the main body 72. This is to facilitate mounting of the separator 30 at the vertically highest possible position in the vent line system.

The top half 40 of the housing 34 also has an integrally formed ball check cage 96. The sidewall 98 has a plurality of slots 100 formed therein and an open bottom 102 that both communicate with the interior chamber 44. As shown in the cross-sectional view of FIG. 3, the sidewall 98 is generally U-shaped with the bottom 102 being formed by a generally cylindrical wall 104.

Contained within the cage 96 is a moveable bypass valve assembly 106 comprising a ball check 108 and a moveable seat 110. The ball check 108 is generally spherical in shape and is sized to rest in the bottom 102 of the cage 96 without falling through the cylindrical wall 104. The ball 108 is hollow, and as such it will float upward in the ball cage 96 when liquid fills the internal chamber 44.

The moveable valve seat 110 has an internal longitudinal bore 112 with an internal shoulder 114 formed therein that faces upward towards the top hose barb 92. Below the shoulder 114 the longitudinal bore 112 increases gradually in diameter to form a cone-shaped seat 116 that is sized and shaped to receive the ball check 108 in sealing engagement such that liquid and gas cannot pass through the longitudinal bore 112 of the moveable seat 110.

The moveable seat 110 has a general cylindrical shape with the diameter of the top portion 118 greater than the diameter of the bottom portion 120, to form an external shoulder 122. Furthermore, the diameter of the top portion 118 is greater than the internal diameter of the ball check cage 96 such that the moveable valve seat 110 rests on the sidewall 98 at the approximate midpoint of the ball check cage 96. A plurality of grooves 124 are formed on the external surface of the moveable seat 110 that provides fluid communication through the lower portion of the ball check cage 96 and the external shoulder 122. When the moveable seat 110 is lifted off the ball check cage 96, fluid can pass from the lower portion of the ball check cage 96 through the grooves 124 and past the external shoulder 122 to the internal grooves 124 of the top hose barb 92. Furthermore, with the moveable seat 110 resting on the ball check cage 96, fluid communication with the internal bore 78 of the top hose barb 92 is possible only through the longitudinal bore 112 of the moveable valve seat 110.

When the ball check 108 is urged upward by rising liquid in the chamber 44, it seats in the cone-shaped seat 116 to prevent the passage of gas and liquid through the moveable seat 110. As the pressure of the rising liquid in the internal chamber 44 increases on the ball 108, the moveable seat 110 is urged upward off the ball cage 96 so that the top surface 126 of the moveable seat 110 bears against the hose barb 92. To urge the moveable seat 110 to move downward as liquid in the chamber 44 recedes, a helical compression spring 128 is placed inside the hose barb 92 so that one end bears against the internal shoulder 80 on the hose barb 92 and the other end bears against the internal shoulder 114 in the moveable seat 110. To provide additional sealing in the fluid communication path, O-rings 130 are used in the upper and lower hose barbs 92 and 70 and in the top portion 118 of the moveable seat 110.

Figure 4:
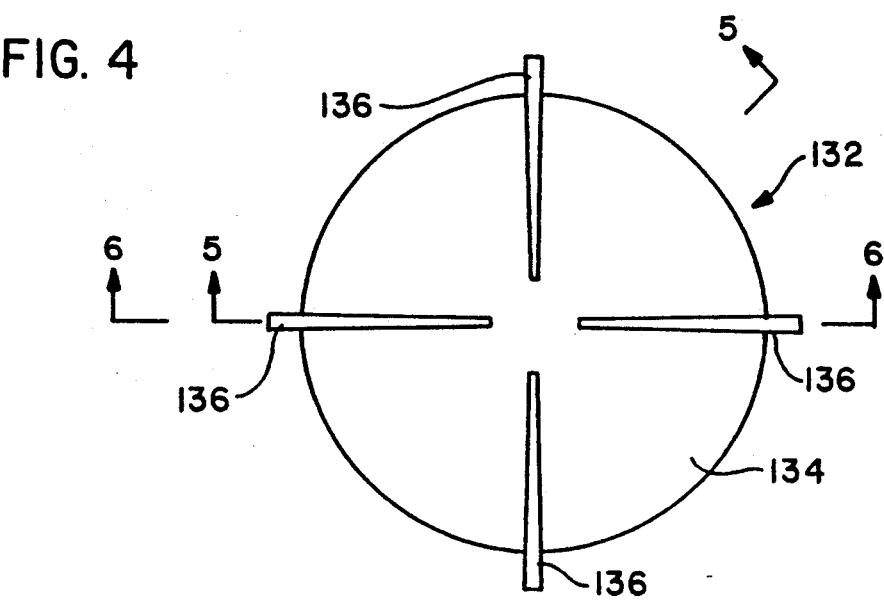
FIG. 4 is a top plan view of a flow diverter formed in accordance with the present invention.
Figure 5:
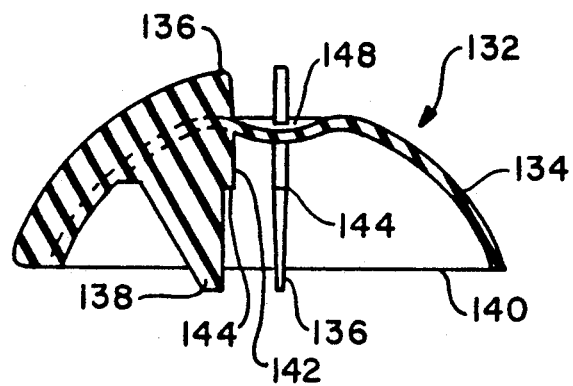
FIG. 5 is a cross-sectional view taken along lines 5—5 of the flow diverter of FIG. 4.
Figure 6:
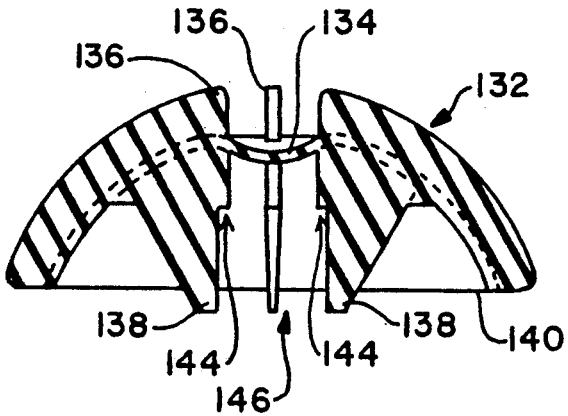
FIG. 6 is another cross-sectional view taken along lines 6—6 of the flow diverter of FIG. 4.

Positioned across the middle of the internal chamber 44 is a flow diverter 132 that will be described in conjunction with FIGS. 4–6. As shown therein, the flow diverter 132 is formed to have a generally mushroom-shaped body 134 with four upstanding ribs 136 integrally formed therewith. Each of the ribs 136 extends outward beyond the diameter of the body 134. As illustrated more clearly in FIGS. 5 and 6, each of the ribs 136 has downwardly projecting legs 138 that extend below the bottom edge 140 of the body 134. The inside face 142 of each leg 138 has a downward facing step 144 formed at the approximate midpoint thereof. The steps 144 on the four legs 138 define an opening 146 that is sized and shaped to receive the riser tube 86 as shown in FIG. 3 such that the top of the riser tube 86 bears against each of the steps 144. The center 148 of the body 134 is dished, as shown in FIGS. 5 and 6, such that a space 152 is created between the cylindrical wall 104 of the ball check cage 96 when the flow diverter 132 is installed in the housing 34. The ribs 136 extend above the body 134 and stop at the dished center 148 such that each of the ribs 136 will bear against the cylindrical wall 104 of the ball check cage 96 as shown in FIG. 3.

Referring again to FIG. 3, when the flow diverter 132 is installed inside the housing 34, the body 134 is held away from the inside surface of the top and bottom halves 40 and 42 by the ribs 136 to create a space 150 between the periphery of the body 134 and the housing 34 to permit the flow of fluid and gas between the bottom half 42 and the top half 40. Furthermore, the opening created between each of the legs beneath the mushroom-shaped body 134 permits fluid communication between the internal chamber at the bottom half 42 of the housing 34 and the riser tube 86. Finally, the space 150 created between the open bottom 102 of the cage 96 and the dished center 148 of the flow diverter 132 permits fluid communication between the internal chamber 44 on the top portion of the flow diverter 132 and the open bottom 102 of the ball check cage 96.

To assemble the separator 30, the lower hose barb 70 with the O-ring 130 installed thereon is threadably engaged with the bottom half 42 of the housing 34. The inlet riser tube 86 is then slidably engaged with the main body 72 of the hose barb 70. It is to be understood, however, that the inlet riser tube 86 may be installed in the main body 72 prior to installing the hose barb 70 in the bottom half 42. Next, an optional screen 154 or other similar filtering device is placed over the riser tube 86 so that its edges rest on the shoulder 54 formed on the inside periphery 48 of the bottom half 42. The flow diverter 132 is then placed over the riser tube 86 so that the top of the riser tube bears against the steps 144 on the flow diverter 132.

Turning now to the top half 40, the ball check 108 is first placed inside the ball check cage 96 followed by the moveable seat 110 that is oriented with the cone-shaped seat 116 facing downward as shown in FIG. 3. The helical compression spring 128 is then placed inside the bore 112 of the moveable seat 110 and inside the top hose barb 92. With the O-ring 130 installed thereon, the top hose barb 92 is then threaded into the outlet port 88 of the top half 40 so that the compression spring 128 bears against the internal shoulder 80 in the hose barb 92. The assembled top half 40, with the O-ring 60 thereon, is placed over the bottom half 42 so that the cylindrical wall 104 of the ball check cage 96 is slidable engaged with the ribs 136 on the flow diverter 132. The top half 30 is then threadably engaged with the bottom half 42, thus completing the assembly of the vent line separator 30.

The separator 30 is installed in a fuel tank system, as shown in FIG. 2. More particularly, the separator 30 is installed in an upright position with a clamp or strap (not shown), preferably placed underneath the Gibs 64 so that the bottom of the Gibs 64 rests on the strap. A first vent line 20 is connected in a conventional manner to the lower hose barb 70 and the fuel tank 14 to provide fluid communication between the separator 30 and the fuel tank 14. A second vent line 21 is connected to the top hose barb 92 and the hull fitting 22 in a conventional manner to provide fluid communication between the separator 30 and the atmosphere.

The operation of the vent line separator 30 will now be described in conjunction with FIGS. 2 and 3. During refueling and normal operations, when gas pressure in the head space of the fuel tank 14 is greater than atmospheric pressure, vapor will be forced from the tank 14, through the first vent line 20, and into the chamber 44 of the housing 34. More particularly, the vapor enters the chamber 44 through the inlet riser tube 86. The vapor then flows through the space 152 between the flow diverter 132 and the housing 34 to the ball check cage 96. Since no liquid is present, the ball check 108 will rest in the bottom of the cage 34 so that vapor flows through the slots 100 in the cage 96, through the longitudinal bore 112 of the moveable seat 110, and out of the chamber 44 to the environment through the second vent line 21.

When liquid is entrapped in the vapor and forced through the first vent line 20 into the separator 30, it is diverted to the bottom half 42 of the housing 34 while vapor passes through the moveable bypass valve assembly 106. This occurs because the liquid and vapor enter the separator 30 through the inlet riser tube 86 and contact the bottom surface of the flow diverter 132. The liquid and vapor are directed by the mushroom-shaped body 134 downward in the internal chamber 44 towards the bottom half 42. However, as the vapor passes by the space 152 between the housing 34 and the flow diverter 132, it separates from the liquid to rise upward in the chamber 44 while the liquid continues downward under the force of gravity. The vapor passes out to the atmosphere under positive pressure through the bypass valve assembly 106 and the outlet port 88. The liquid in the bottom half 42 collects around the lower hose barb 70 where it returns to the first vent line 20 and the tank 14 by means of the grooves 82 in the main body 72 of the hose barb 70. The chamber 44 has sufficient volume to contain the typical amount of liquid fuel that would be vented out of the tank 14 under normal conditions. Thus, the separator 30 maintains continuous venting with the atmosphere under normal conditions.

However, should liquid continue to accumulate in the separator 30, the bypass valve assembly 106 prevents it from being vented overboard by normal pressures. Referring again to FIG. 3, as liquid accumulates in the chamber 44, it is allowed to rise past the flow diverter 132 into the top half 40 of the housing 34. When the fluid accumulates around the ball check 108, the ball check 108 rises and seats in the moveable seat 110. The moveable seat 110 is urged downward by the compression spring 128 to remain seated against the ball check cage 96. With the ball check 108 firmly seated in the moveable seat 110, liquid and vapor are prevented from being vented to the atmosphere. To meet current safety standards, the compression spring 128 is designed to resist pressures up to approximately 2.4 pounds per square inch. When the internal pressure of the liquid in the interior chamber 44 dissipates, the liquid drains through the grooves 82 in the bottom hose barb 70 and returns to the tank 14.

Under abnormal conditions, it is possible that pressures inside the vent system can exceed 2.4 pounds per square inch. Pursuant to proposed safety standards, all fuel tank venting systems are required to release liquid pressure above 2.4 pounds per square inch. Accordingly, when liquid accumulating in the interior chamber 44 urges the ball check 108 against the moveable seat 110 with a pressure greater than 2.4 pounds per square inch, the moveable seat 110 rises upward against the pressure of the compression spring 128, causing the shoulder 122 and O-ring 130 to come out of contact with the ball check cage 96. When this occurs, liquid fuel can pass through the grooves 124 in the moveable seat 110 and around the top portion 118 of the bypass valve assembly 106 and thence to the outlet port 88. If the moveable seat 110 continues to travel upwards until it contacts the top hose barb 92, fluid and vapor can continue to flow through the upper hose barb 70 by passing through the grooves 82 in the main body 72 of the hose barb 70. As liquid pressure in the separator 30 falls below 2.4 pounds per square inch, the compression spring 128 urges the moveable seat 110 back into contact with the ball check cage 96 to prevent additional overboard venting of liquid and vapor. Liquid in the interior chamber will recede and the ball check 108 then moves out of contact with the moveable seat 110, atmospheric pressure can then be restored to the fuel tank system.

While a preferred embodiment of the invention has been illustrated and described herein, it is to be understood that various changes can be made without departing from the spirit and scope of the invention. Consequently, the scope of the invention is to be limited only by the claims that follow.

The embodiments of the invention in which an exclusive property or privilege is claimed are defined as follows:

1. A liquid storage tank vent line separator, comprising:
   means for defining a chamber;
   means for introducing liquid and gas fluid into said chamber means;
   means for providing fluid communication between said chamber means and the atmosphere;
   means in said chamber for diverting the flow of liquid from said introducing means to a lower portion of said chamber means and to permit the flow of vapor and gas to said fluid communication means and to permit the flow of atmospheric gas from the atmosphere through said fluid communication means to said fluid introducing means;
   valve means for selectively permitting the flow of liquid and gas through said fluid communication means such that liquid is permitted to flow through said fluid communication means only above a predetermined liquid pressure in said chamber means; and
   means for returning liquid in said lower portion of said chamber means to said introducing means.

2. The separator of claim 1, wherein said liquid diversion means further includes means for permitting the flow of liquid from said lower portion of said chamber means to said fluid communication means as said chamber means fills with liquid.

3. The separator of claim 2, wherein said valve means permits a continuous flow of liquid and gas from said chamber means to said fluid communication means when the liquid in said chamber means is above a predetermined maximum liquid pressure and permits a continuous flow of gas when the liquid pressure in said chamber means is below a minimum predetermined liquid pressure and said valve means prevents the flow of liquid and gas when the liquid pressure in said chamber means is below said predetermined maximum liquid pressure and above said predetermined minimum liquid pressure.

4. A fuel tank vent line separator for fuel tank venting systems, the fuel tank having a first opening for a fill tube and a second opening for a vent line, said vent line having a first end in fluid communication with the head space in the fuel tank and a second end in fluid communication with the atmosphere, the separator comprising:
   a housing defining an interior chamber;
   a first port in said housing in continuous fluid communication with said chamber;
   a second port in said housing in fluid communication with said chamber and in fluid communication with the atmosphere;
   means for separating liquid from gas, said separating means being positioned in said chamber between said first and second ports, said separating means configured to permit liquid and gas to pass from said first port to said second port after separation of the liquid and the gas;
   valve means for selectively permitting the flow of liquid and gas through said second port such that liquid is permitted to flow through said second port only above a predetermined liquid pressure; and
   means for returning liquid in said chamber to said first port.

5. The separator of claim 4, wherein said housing further includes means for attaching said housing to a structural member.

6. The separator of claim 4, wherein said second port is positioned vertically higher than said first port.

7. The separator of claim 4, wherein said valve means is formed to permit a continuous flow of liquid and gas when the liquid pressure in said chamber is above a predetermined maximum liquid pressure and to permit a continuous flow of gas when the liquid pressure in said chamber is below a minimum predetermined liquid pressure and to prevent the flow of liquid and gas when the liquid pressure in said chamber is below the predetermined maximum liquid pressure and above a predetermined minimum liquid pressure.

8. A fuel tank venting system, comprising:
   a fuel tank having a first opening for a fill tube and a second opening for a vent line;
   a housing defining an interior chamber;
   a first port in said housing in continuous fluid communication with said chamber;

a first vent line having one end in fluid communication with said second opening in said fuel tank and another end in fluid communication with said first port to provide continuous fluid communication with said first port and said chamber;

a second port in said housing in fluid communication with said chamber;

a second vent line having one end in fluid communication with said second port and a second end in fluid communication with the atmosphere to provide continuous fluid communication between said second port and the atmosphere;

means for diverting the flow of fluid entering said chamber from said first port such that liquid entering said chamber from said first port is diverted to flow to a lower portion of said chamber and vapor and gas is permitted to flow to said second port and thence to the atmosphere and atmospheric gas is permitted to flow from said second port to said first port and thence into the tank, said fluid flow diverting means being further configured to permit the flow of liquid to said second port as said chamber fills with liquid;

valve means for selectively permitting the flow of liquid and gas through said second port and into said second vent line such that liquid is permitted to flow through said second port only when the liquid pressure in said chamber is above a predetermined maximum liquid pressure; and means for returning liquid and gas in said chamber to said first port and thence to the tank such that atmospheric pressure is maintained in the tank and liquid is prevented from being discharged from the tank through the vent lines to the environment.

9. The system of claim 8, wherein said housing further includes means for attaching said housing to a structural member.

10. The system of claim 8, wherein said second port is positioned vertically higher than said first port.

11. The system of claim 8, wherein said valve means is further configured to permit a continuous flow of liquid and gas when the liquid pressure in said chamber is above said predetermined maximum liquid pressure and to permit a continuous flow of gas when the liquid pressure in said chamber is below a predetermined minimum liquid pressure and prevent the flow of liquid and gas when the liquid pressure in said chamber is below said predetermined maximum liquid pressure and above said predetermined minimum liquid pressure.

* * * * *